United States Patent [19]

Chown

[11] Patent Number: 4,679,251

[45] Date of Patent: Jul. 7, 1987

[54] OPTICAL RECEIVER

[75] Inventor: David P. M. Chown, Great Dunmow, Great Britain

[73] Assignee: International Standard Elecric Corporation, New York, N.Y.

[21] Appl. No.: 781,831

[22] Filed: Sep. 30, 1985

[30] Foreign Application Priority Data

Sep. 29, 1984 [GB] United Kingdom ............... 8424642

[51] Int. Cl.[4] ............................................... H04B 9/00
[52] U.S. Cl. ............................. 455/619; 250/214 A; 330/59; 330/110; 330/308
[58] Field of Search ............... 455/606, 607, 617, 619; 250/214 A, 214 AG, 214 L, 214 DC, 214 RC, 214 P, 214 R, 214 C; 330/110, 59, 308; 307/311

[56] References Cited

U.S. PATENT DOCUMENTS 4,218,613  8/1980  Bletz .......................................... 330/59
4,323,774  8/1982  Kopp ....................................... 307/311
4,620,321 10/1986  Chown .................................... 455/619

Primary Examiner—Joseph A. Orsino, Jr.
Attorney, Agent, or Firm—Lee, Smith & Zickert

[57] ABSTRACT

In an optical receiver for the reception of a modulated light beam, the beam falls on a PIN diode connected to the input of an amplifier which has a feedback resistor across it. This resistor is shunted by the series combination of a Schottky diode and of a PIN diode. The former diode ensures that a high magnitude pulse does not leave the receiver undesirably insensitive to a following smaller pulse. The latter diode, due to its low self-capacitance and low leakage, overcomes distortions due to the Schottky diode's higher self-capacitance and leakage. These effects are enhanced by providing the series-connected diodes with a low value (e.g. 0.2 volts) of reverse bias, due to the different connections of the diodes and the feedback resistor to a potential divider between the amplifier output and a point at a reference potential.

3 Claims, 4 Drawing Figures

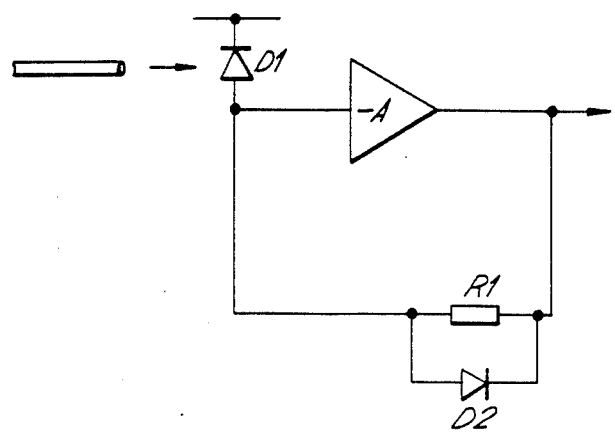
Fig. 1.
Fig. 2.
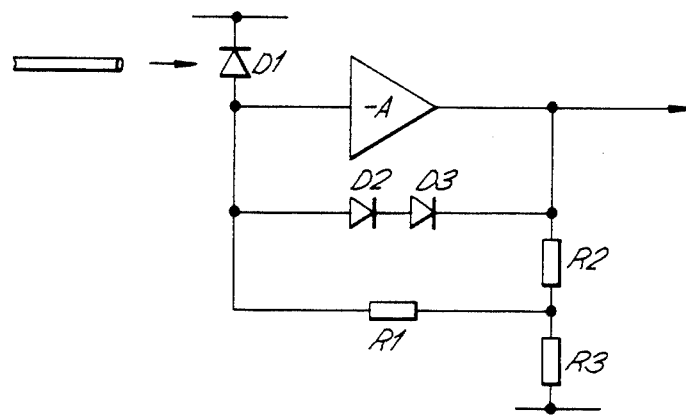
Fig. 3.
Fig. 4.
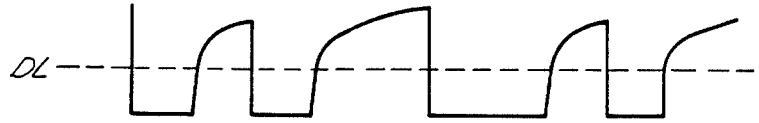

OPTICAL RECEIVER

BACKGROUND OF THE INVENTION

This invention relates to an optical fiber receiver, such as may be used to terminate an optical transmission line, or to receive a light beam in free space.

SUMMARY OF THE PRIOR ART

In British Application No. 8313855 filed May 19, 1983 (no U.S. equivalent) we have described and claimed an optical fiber receiver a simplified circuit diagram of which is shown at FIG. 1. This shows a transimpedance optical receiver in which light from an optical transmission line (or possibly from a light beam in free space) falls on a P-I-N diode 1 connected to the input of an amplifier 2, the output of which is connected to the receiver's detection circuitry. A resistive impedance 3 is connected in a feedback path from the amplifier's output to its input. For the receiver to have good sensitivity it needs a high value resistor for R1 since the square of the thermal noise is inversely proportional to its value. However, since all of the photo-current passes through R1, a low value is necessary to allow operation with large optical signals.

To deal with the above conflicting requirements a non-linear Schottky diode 4 is connected in parallel with the resistor 3. A Schottky diode is used because of its very low self-capacitance, allowing a wide bandwidth to be obtained from the receiver. At low optical inputs, diode 4 has a high impedance and thus has little effect on the receiver's response, while with large optical inputs, diode 4 conducts to limit the output of the receiver, and thus avoids saturation. Thus good sensitivity is realized at the same time as wide intermessage dynamic range, which is of particular value when the receiver is used in a multi-terminal optical fiber data bus system.

To maintain this performance at high temperatures, a diode with particularly low leakage is needed, so that its slope resistance remains high compared with the resistance of R1 and its noise contribution is insignificant. Thus one application of the receiver is for a 1 Mbit/sec. serial data bus for a military system. To maintain sensitivity at +125° C. a diode whose leakage is below 50 nA at +125 ° C. is needed. Further, its self-capacitance must be below 0.2 pF.

Unfortunately, available Schottky diodes suffer leakages of at least several hundreds of nA at +125° C.

SUMMARY OF THE INVENTION

An object of the present invention is to provide an optical receiver which is an improvement on the receiver of our above-quoted application.

According to the invention, there is provided an optical receiver for the reception of a modulated light beam from an optical fiber transmission line or from free space, which includes a PIN diode on to which the modulated light beam is directed to produce therein an electrical current appropriate to the modulated beam, an amplifier to an input of which the diode is connected and the output of which is applied to the detection circuitry of the receiver, a resistive load connected across the amplifier, and the series combination of a non-linear Schottky diode and a PIN diode connected across the resistive load, the two series-connected diodes being similarly orientated, wherein the Schottky diode acts as a dynamic load to prevent saturation of the amplifier under high input signal conditions and the PIN diode minimizes the deleterious effects of the leakage and self-capacitance characteristics of the Schottky diode.

BRIEF DESCRIPTION OF THE DRAWINGS

FIG. 1 discloses a circuit for a prior art optical receiver.

FIG. 2 discloses a waveform for a circuit using a PIN diode instead of the Schottky diode of the present invention.

FIG. 3 discloses a circuit embodiment of the optical receiver of the invention.

FIG. 4 discloses a waveform for the circuit of FIG. 3.

DETAILED DESCRIPTION OF THE INVENTION

The receiver of FIG. 4 is similar in many respects to that of FIG. 1, so that the same reference numerals will be used to designate equivalent elements. The circuitry includes another diode, 5, in series with the Schottky diode 4, this diode 5 being a P-I-N diode. Such diodes are readily available whose zero-bias self-capacitance and leakage are suitable for the requirement mentioned above. Thus the Hewlett-Packard HP 5082-0001 PIN diode has 0.18 pF zero bias self-capacitance, and a leakage of about 20 nA at +125° C.

PIN diodes currently available do suffer from relatively high minority carrier lifetimes, resulting in a recovery time constant of, typically, 100 to 200 nsec. Although this does not in fact impair the ability of the receiver to recover rapidly, e.g. within 2 usec. following a high-power signal, such stored charge can unacceptably distort received pulses. This is indicated in FIG. 2 which shows how the pulses would be distorted if a PIN diode were used instead of a Schottky diode.

The inclusion in the feedback path of both a Schottky diode 4 and a PIN diode 5, as shown in FIG. 3, overcomes the problems due to the former without introducing any problems due to the characteristics of the latter. Thus in the circuit of FIG. 3, distortion is reduced to negligible, and hence acceptable, levels, since minimal minority carrier storage takes place in the Schottky diode. This is shown in the waveform diagram of FIG. 4, where we see the pulses from the receiver's output, each of which has a steep leading edge portion followed by curved portions. Here we see the rapid initial recovery due to the lack of charge storage in the Schottky diode 4, followed by the slower recovery due to the PIN diode 5.

The performance of the receiver can be further enhanced by slightly reverse biassing the diodes under small signal conditions. This is effected by connecting the output of the amplifier to a reference potential, e.g. ground, via two series connected resistors 6 and 7. With the diodes connected to the upper end of resistor 6 and the resistor 3 connected to the junction between resistors 6 and 7, and the values of R2 and R3 suitably chosen, we get a reverse bias of approximately 0.2 volts on the diodes. This enables the maximum slope resistance and minimum self-capacitance of the PIN diode to be realized.

While I have described above the principles of my invention in connection with specific apparatus, it is to be clearly understood that this description is made only by way of example and not as a limitation to the scope of my invention as set forth in the objects thereof and in the accompanying claims.

I claim:

1. An optical receiver for the reception of a modulated light beam, which comprises a PIN diode on to which the modulated light beam is directed to produce therein an electrical current proportional to the modulated beam, an amplifier to an input of which the diode is connected and the output of which is applied to the detection circuitry of the receiver, a resistive load connected across the amplifier, and the series combination of a non-linear Schottky diode and a PIN diode connected across the resistive load, the two series-connected diodes having their cathodes pointing in the same direction, wherein the Schottky diode acts as a dynamic load to prevent saturation of the amplifier under high input signal conditions and the PIN diode minimizes the deleterious effects of the leakage and self-capacitance characteristics of the Schottky diode.

2. An optical receiver as claimed in claim 1 wherein the series-connected diodes are subjected to a small reverse bias.

3. An optical receiver as claimed in claim 2 wherein the resistive load is connected to a tapping on a potential divider connected between said amplifier output and a reference potential.

* * * * *